United States Patent
Toussaint et al.

(10) Patent No.: US 9,926,234 B2
(45) Date of Patent: *Mar. 27, 2018

(54) ULTRA-HIGH PERFORMANCE CONCRETES HAVING A LOW CEMENT CONTENT

(71) Applicant: LAFARGE, Paris (FR)

(72) Inventors: Fabrice Toussaint, Saint Quentin Fallavier (FR); Gërard Molines, Saint Quentin Fallavier (FR); Rémi Barbarulo, Saint Quentin Fallavier (FR)

(73) Assignee: LAFARGE, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/320,157

(22) PCT Filed: Jun. 18, 2015

(86) PCT No.: PCT/EP2015/063684
§ 371 (c)(1),
(2) Date: Dec. 19, 2016

(87) PCT Pub. No.: WO2015/193420
PCT Pub. Date: Dec. 23, 2015

(65) Prior Publication Data
US 2017/0152183 A1 Jun. 1, 2017

(30) Foreign Application Priority Data
Jun. 20, 2014 (FR) ..................... 14 55728

(51) Int. Cl.
*C04B 28/14* (2006.01)
*C04B 28/04* (2006.01)
*C04B 7/52* (2006.01)
*C04B 18/14* (2006.01)
*C04B 14/06* (2006.01)
*C04B 14/28* (2006.01)
*C04B 103/50* (2006.01)

(52) U.S. Cl.
CPC .............. *C04B 28/14* (2013.01); *C04B 7/527* (2013.01); *C04B 14/06* (2013.01); *C04B 14/28* (2013.01); *C04B 18/146* (2013.01); *C04B 28/04* (2013.01); *C04B 2103/50* (2013.01); *C04B 2201/52* (2013.01)

(58) Field of Classification Search
CPC ......... C04B 28/04; C04B 28/14; C04B 14/04; C04B 14/06; C04B 14/28; C04B 14/42; C04B 14/48; C04B 14/4668; C04B 16/0641; C04B 2003/0027; C04B 18/146; C04B 5/527; C04B 2103/50; C04B 2201/52
See application file for complete search history.

(56) References Cited

U.S. PATENT DOCUMENTS

| | | | | |
|---|---|---|---|---|
| 5,584,927 A | * | 12/1996 | Yonezawa | C04B 20/008 106/713 |
| 5,735,947 A | * | 4/1998 | Hopkins | C04B 5/00 106/714 |
| 2004/0204516 A1 | * | 10/2004 | DeFord | C04B 28/04 524/2 |
| 2012/0012034 A1 | | 1/2012 | Guynn et al. | |
| 2014/0299023 A1 | * | 10/2014 | Guynn | C04B 28/04 106/709 |
| 2015/0144030 A1 | * | 5/2015 | Guynn | C04B 20/008 106/707 |

FOREIGN PATENT DOCUMENTS

| | | |
|---|---|---|
| EP | 0 518 777 A1 | 12/1992 |
| EP | 0 934 915 A1 | 8/1999 |
| EP | 2 275 390 A1 | 1/2011 |
| FR | 2 837 819 A1 | 10/2003 |
| WO | WO 2009/111295 A1 | 9/2009 |
| WO | WO 2010/109095 A1 | 9/2010 |

OTHER PUBLICATIONS

International Search Report as issued in International Patent Application No. PCT/EP2015/063684, dated Oct. 20, 2015.
Preliminary Search Report as issued in French Patent Application No. 1455728, dated Mar. 13, 2015.
Rougeau, P., et al., "Ultra High Performance Concrete with ultrafine particles other than silica fume," Proceedings of the International Symposium on Ultra High Performance Concrete, Jan. 2004, XP008112203, pp. 213-225.
International Preliminary Report on Patentability and the Written Opinion of the International Searching Authority as issued in International Patent Application No. PCT/EP2015/063684, dated Dec. 20, 2016.

* cited by examiner

*Primary Examiner* — Anthony J Green
(74) *Attorney, Agent, or Firm* — Pillsbury Winthrop Shaw Pittman LLP

(57) ABSTRACT

A hydraulic binder includes, as percentage by mass: from 17 to 55% of a Portland cement, the particles of which have a D50 of from 2 µm to 11 µm; at least 5% of silica fume; from 36 to 70% of a mineral addition A1, the particles of which have a D50 of from 15 to 150 µm; the sum of these percentages being from 80 to 100%; the sum of the percentages of cement and of silica fume being greater than 28%; the mineral addition A1 being selected from slags, pozzolanic additions or siliceous additions such as quartz, silicocalcareous mineral additions, calcareous additions such as calcium carbonate or mixtures thereof.

14 Claims, No Drawings

ULTRA-HIGH PERFORMANCE CONCRETES HAVING A LOW CEMENT CONTENT

CROSS-REFERENCE TO RELATED APPLICATIONS

This application is the U.S. National Stage of International Application Serial No. PCT/EP2015/063684, filed Jun. 18, 2015, which in turn claims priority to French Application No. 1455728, filed Jun. 20, 2014. The contents of all of these applications are incorporated herein by reference in their entirety.

The invention relates to hydraulic binders which give the possibility of obtaining an ultra-high performance concrete with low cement content, and to mixtures comprising this binder.

Technological progress in recent years in the field of concretes has led to the development of hydraulic binders allowing ultra-high performance concretes to be obtained, particularly in terms of compressive strength. These binders generally involve the recourse to additional materials other than the cement and aggregate e.g. fibers, organic admixtures, or so-called ultra-fine particles.

However, conventional ultra-high performance concretes have a relatively high cement content, generally of 700 kg cement/m$^3$ concrete to 1,000 kg cement/m$^3$ concrete.

Yet the production of cement, in particular the production of clinker, is the cause of strong carbon dioxide emissions. Indeed, clinker production requires:

a) preheating and decarbonatation of the crude flour obtained by milling raw materials i.e. limestone and clay in particular; and b) firing the decarbonated flour at a temperature of about 1,450° C., followed by sudden cooling.

These two steps produce $CO_2$, first as direct product of decarbonatation and secondly as by-product of the combustion conducted at the firing step to provide a temperature rise.

The strong carbon dioxide emissions resulting from conventional methods to produce cementitious compositions and concrete amount to a major environmental problem, and in today's context will become the subject of high penalties on a financial level.

There is therefore a strong need for a method allowing ultra-high performance concrete to be produced with a reduction in associated emissions of carbon dioxide.

To attain this objective, the present invention proposes a hydraulic binder comprising as percentage by mass:

from 17 to 55% of a Portland cement the particles of which have a D50 comprised from 2 μm to 11 μm;
at least 5% of silica fume;
from 36 to 70% of a mineral addition A1 the particles of which have a D50 comprised from 15 to 150 μm;
the sum of these percentages being comprised from 80 to 100%;
the sum of the percentages of cement and silica fume being greater than 28%;
the mineral addition A1 being selected from among slags, pozzolanic additions or siliceous additions such as quartz, siliceous limestone mineral additions, limestone additions such as calcium carbonate or mixtures thereof.

The object of the present invention is also a mixture comprising in volume percentage, at least 45% of the hydraulic binder according to the invention and at least 30% of sand, the sum of these percentages being comprised from 95 to 100%.

The object of the present invention is also a hydraulic composition comprising in a volume of 1 m$^3$ excluding entrained air and excluding fibers:

from 155 to 205 liters of water;
at least 770 liters of mixture according to the invention; the sum of the volumes of these 2 components being comprised from 950 to 1,000 liters.

The invention also proposes a shaped object for the field of building comprising the hydraulic binder according to the invention or the mixture according to the invention.

The invention seeks to provide at least one of the determining advantages described hereafter.

The invention gives the possibility of achieving the need for reduction of $CO_2$ emissions. Indeed, the amount of cement (and in particular of clinker) used within the scope of the present invention is less than the one which is traditionally required for ultra-high performance concretes, up to 148 kg/m$^3$ of cement per m$^3$ of concrete.

Advantageously, the hydraulic composition according to the invention has very high mechanical strength, generally of 90 MPa or greater at 28 days.

Other advantages and features of the invention will become clearly apparent upon reading the description and the examples given as purely illustrations and not as limitations which will follow.

The object according to the invention is a hydraulic binder comprising a mass percentage:

from 17 to 55% of a Portland cement the particles of which have a D50 comprised from 2 μm to 11 μm;
at least 5% of silica fume;
from 36 to 70% of a mineral addition A1 the particles of which have a D50 comprised from 15 to 150 μm;
the sum of these percentages being comprised from 80 to 100%;
the sum of the percentages of cement and silica fume being greater than 28%;
the mineral addition A1 being selected from among slags, pozzolanic additions or siliceous additions such as quartz, siliceous limestone mineral additions, limestone additions such as calcium carbonate or mixtures thereof.

A hydraulic binder is a material which sets and hardens by hydration.

The setting is generally the passing to the solid state of a hydraulic binder by hydration reaction. The setting is generally followed by a hardening period.

The hardening is generally the acquisition of mechanical strengths of a hydraulic binder. The hardening generally takes place after the end of the setting.

The hydraulic binder according to the invention comprises a Portland cement. The Portland cement in the sense of the invention incorporates a Portland clinker. The use of a milled Portland clinker as a Portland cement may also be contemplated, provided further addition of calcium sulfate.

The preferred Portland cements are those as defined in the European standard NF EN 197-1 as of April 2012 and those described in the ASTM C150-12 standard, more preferentially, these are CEM I cements.

Preferably, the hydraulic binder according to the invention comprises from 17 to 50% of Portland cement, more preferentially from 18 to 45%, expressed in a mass percentage based on the binder.

The cements suitable for use according to the present invention are generally Portland cements for which the BET surface area is comprised from 1.20 to 3 m$^2$/g, preferably comprised from 1.20 to 2.5 m$^2$/g.

The BET specific surface area is a measurement of the actual total surface area of the particles, which takes into account the presence of reliefs, irregularities, surface or internal cavities, porosity.

The cements suitable for use according to the present invention are preferably cements the particles of which have a D10 comprised from 1 μm to 4 μm, more preferentially from 1 μm to 3 μm, even more preferentially from 1 μm to 2.5 μm. The cements suitable for use according to the present invention are preferably cements the particles of which have a D50 comprised from 3 μm to 10 μm, more preferentially from 4 μm to 9 μm.

The cements suitable for use according to the present invention are preferably cements the particles of which have a D90 comprised from 8 μm to 25 μm, more preferentially 9 μm to 24 μm.

D90, also noted as $D_v 90$, corresponds to the 90$^{th}$ centile of the volume distribution of particle sizes, i.e. 90% of the volume consists of particles for which the size is less than D90 and 10% with a size greater than D90.

Also, D50, also noted as $D_v 50$, corresponds to the 50$^{th}$ centile of the volume distribution of particle sizes, i.e. 50% of the volume consists of particles for which the size is less than D50 and 50% with a size greater than D50.

Also, D10, also noted as $D_v 10$, correspond to the 10$^{th}$ centile of the volume distribution of particle sizes, i.e. 10% of the volume consists of particles for which the size is less than D10 and 90%) with a size greater than D10.

D10 or D90 of a set of particles may generally be determined by laser grain size measurement for particles with a size of less than 800 μm, or by screening for particles with a size of more than 63 μm.

Preferably, the Portland cement suitable for use according to the present invention has a Blaine specific surface area is greater than or equal to 5,000 cm$^2$/g, preferably greater than or equal to 6,500 cm$^2$/g.

The Portland cement able to be used according to the present invention may be milled and/or separated (using a dynamic separator) to obtain a cement having a Blaine specific surface area greater than or equal to 5,000 cm$^2$/g. This cement may be qualified ultra-fine. The cement may be milled using 2 methods for example.

According to the first method, the cement or clinker may be ground to a Blaine specific surface area of 5,000 to 9,000 cm$^2$/g. A second or third generation, high-efficiency separator or very high-efficiency separator may be used at this first step to separate the cement having the desired fineness from the cement not having the desired fineness. The latter is then returned to the mill.

According to a second method, a Portland cement may be passed through a very high-efficiency separator, known as a very high fineness separator (VHF), to separate the cement particles having a Blaine specific surface area greater than or equal to the target fineness (the target fineness being greater than 5,000 cm$^2$/g) from the cement particles having a Blaine specific surface area lower than the target fineness. The cement particles having a Blaine specific surface area greater than or equal to the target fineness may be used as such. The cement particles having a Blaine specific surface area lower than the target fineness may be set aside or milled separately until the desired Blaine specific surface area is obtained. The mills that may be used in both methods are for example ball mills, vertical mills, roller presses, horizontal mills (e.g. of Horomill© type) or an agitated vertical mill (e.g. of Tower Mill type).

The hydraulic binder according to the invention comprises silica fume.

Silica fume suitable according to the invention may be a by-product of metallurgy and of silicon production. Silica fume is generally formed with spherical particles comprising at least 85% by mass of amorphous silica.

Preferably, the silica fume used according to the present invention may be selected from among silica fumes according to the European standard NF EN 197-1 of February 2001 paragraph 5.2.7.

Preferably, the hydraulic binder according to the invention comprises 5 to 45% of silica fume, more preferably 5 to 40%, further preferably 6 to 30%, expressed as percentage by mass relative to the binder.

The hydraulic binder according to the invention comprises a mineral addition A1 selected from among slags, pozzolanic additions or siliceous additions such as quartz, siliceous limestone mineral additions, limestone additions such as calcium carbonate or mixtures thereof.

The mineral additions A1 also suitable for the invention may be selected from among slags optionally ground, calcined shales, materials containing calcium carbonate, fly ashes, zeolites, ashes derived from the combustion of plants, calcined clays and mixtures thereof.

Preferably, the mineral additions A1 suitable for the invention may be silica and/or calcium carbonate fines.

For example, the mineral additions A1 are calcined shales (for example as defined in the NF EN 197-1 standard, paragraph 5.2.5), mineral additions comprising calcium carbonate, e.g. limestone (for example as defined in the NF EN 197-1 standard, paragraph 5.2.6), mineral additions comprising silica, e.g. siliceous fines or mixtures thereof.

Preferably, the hydraulic binder according to the invention comprises from 36 to 68% of addition A1, more preferably from 36 to 66%, expressed as percentage by mass relative to the binder.

The hydraulic binder according to the invention may further comprise calcium sulfate.

Preferably, the hydraulic binder according to the invention further comprises from 0.01 to 8% of calcium sulfate, expressed as a mass percentage based on the binder.

Calcium sulfate exists in the natural state. It is also possible to use a calcium sulfate which is a by-product of certain industrial processes. The calcium sulfate may or may not be anhydrous.

Preferably, when the fineness of the cement increases, it is also possible to increase the amount of calcium sulfate in order to obtain optimal mechanical strengths. One skilled in the art will know from his/her knowledge how to optimize the amount of calcium sulfate by using known methods. This optimization will be accomplished depending on the fineness of the cement particles.

The hydraulic binder according to the invention may also comprise from 0 to 20%, expressed as percentage by mass relative to the binder, of pozzolanic materials (e.g. such as defined in European standard NF EN 197-1 of February 2001 paragraph 5.2.3), slags (e.g. such as defined in European standard NF EN 197-1 of February 2001 paragraph 5.2.2), calcined shales (e.g. such as defined in European standard NF EN 197-1 of February 2001 paragraph 5.2.5), materials containing calcium carbonate, limestone for example (e.g. such as defined in European standard NF EN 197-1 of February 2001 paragraph 5.2.6), siliceous additions (e.g. such as defined in French standard NF P 18-509 of December 1998 paragraph 5), fly ashes (e.g. such as defined in European standard NF EN 197-1 of February 2001 paragraph 5.2.4) or mixtures thereof.

Another object according to the invention is also a mixture comprising a volume percentage, of at least 45% of the hydraulic binder according to the invention and at least 30% of sand, the sum of these percentages being comprised from 95 to 100%.

The mixture according to the invention comprises a sand.

Preferably, the sand of the mixture according to the invention is a siliceous sand, a calcined bauxite sand, a siliceous limestone sand, a limestone sand or mixtures thereof.

The grain size of the sands is generally determined by screening.

Preferably, the mixture according to the invention comprises a sand the particles of which have a D10 comprised from 100 μm to 1 mm.

Preferably, the mixture according to the invention comprises a sand the particles of which have a D50 comprised from 200 μm to 3 mm, more preferentially comprised from 250 to 1,000 μm.

Preferably, the mixture according to the invention comprises a sand the particles of which have a D90 of less than or equal to 5 mm, more preferentially a D90 comprised from 300 μm to 5 mm, still more preferentially a D90 comprised from 350 μm to 1,000 μm.

Preferably, the mixture according to the invention comprises a sand the particles of which have a D10 comprised from 100 μm to 1 mm and a D50 comprised from 200 μm to 3 mm and a D90 from 300 μm to 5 mm.

Another object according to the invention is also a hydraulic composition comprising in a volume of 1 m³ excluding entrained air, and excluding fibers, comprises:
from 155 to 205 liters of water;
at least 770 liters of mixture according to the invention;
the sum of the volumes of these 2 components being comprised from 950 to 1,000 liters.

In general, the water comprises the water added for mixing and the water of the admixtures, also known as total water.

The hydraulic composition according to the invention both includes compositions in a fresh condition and in the set condition, for example a cement slurry, a mortar or a concrete.

The hydraulic composition according to the invention may also comprise an admixture, for example one of those described in the EN 934-2 standards as of September 2002, EN 934-3 standard as of November 2009 or EN 934-4 as of August 2009, and optionally mineral additions.

Preferably, the hydraulic compositions according to the invention also comprise an admixture for a hydraulic composition, for example an accelerator, a viscosifying agent, an antifoaming agent, a retarder, a clay inerting agent, a shrinkage-reducing agent, a plasticizer and/or a superplasticizer. In particular, it is useful to include a superplasticizer of the polycarboxylate type, in particular from 0.01 to 5%, preferably from 0.1 to 3%, a percentage expressed in dry extract mass based on the cement mass.

It should be noted that these admixtures may be added to the binder or to the mixture according to the invention.

The hydraulic composition according to the invention may further comprise a fluidifying agent or a superplasticizer.

The term of "superplasticizer" as used in the present description and in the claims which accompany it is to be understood as including both water reducing agents and superplasticizers as described in the book entitled *Concrete Admixtures Handbook, Properties Science and Technology*", V. S. Ramachandran, Noyes Publications, 1984.

A water reducing agent is defined as an admixture which typically reduces the amount of mixing water by 10 to 15% typically of a concrete for a given workability. The water reducing agents include, for example lignosulfonates, hydroxycarboxylic acids, carbohydrates and other specialized organic compounds, e.g. glycerol, polyvinyl alcohol, sodium alumino-methyl-siliconate, sulfanilic acid and casein.

The superplasticizers belong to a new class of water reducing agents, chemically different from normal water reducing agents and able to reduce the amounts of water by about 30%. Superplasticizers have been globally classified in four groups: sulfonated condensates of naphthalene formaldehyde (SNF) (generally a sodium salt); sulfonate condensates of melamine formaldehyde (SMF); modified lignosulfonates (MLS); and others. More recent superplasticizers include polycarboxylic compounds such as polycarboxylates, e.g. polyacrylates. A superplasticizer is preferably a new generation superplasticizer, e.g. a copolymer containing a polyethylene glycol as a grafted chain and carboxylic functions in the main chain like a polycarboxylic ether. Sodium polycarboxylates-polysulfonates and sodium polyacrylates may also be used. The derivatives of phosphonic acid may also be used. The required amount of superplasticizer generally depends on the reactivity of the cement. The lower the reactivity, the smaller is the required amount of superplasticizer. In order to reduce the total amount of alkaline salts, the superplasticizer may be used as a calcium salt rather than as a sodium salt.

Derivatives of phosphonic acids may also be used. Sodium polycarboxylate-polysulfonates and sodium polyacrylates may also be used. The required amount of superplasticizer generally depends on the reactivity of the cement. The lower the reactivity, the smaller is the required amount of super-plasticizer. In order to reduce the total content of alkaline salts, the superplasticizer may be used as a calcium salt rather than as a sodium salt.

The hydraulic composition according to the invention may further comprise an antifoaming agent, for example polydimethylsiloxane. The antifoaming agents also comprise silicones as a solution, solid or preferably as a resin, an oil or an emulsion, preferably in water. Silicones comprising groups ($RSiO_{0.5}$) and ($R_2SiO$) are most particularly suitable. In these formulae, the radicals R, which may either be identical or different, are preferably a hydrogen atom or an alkyl group with 1 to 8 carbon atoms, the methyl group being preferred. The number of units is preferably from 30 to 120.

The hydraulic composition according to the invention may further comprise a viscosifying agent and/or an agent for modifying the flow limit (generally for increasing viscosity and/or flow limit). Such agents comprise: derivatives of cellulose, for example cellulose ethers soluble in water, such as sodium carboxymethyl, methyl, ethyl, hydroxyethyl and hydroxypropyl ethers; alginates; and xanthan, carrageenan or guar gum. A mixture of these agents may be used.

The hydraulic composition according to the invention may further comprise an accelerator and/or a retarder.

The hydraulic composition according to the invention may further comprise fibers, for example mineral fibers (e.g. glass, basalt), organic fibers (e.g. plastic of APV type), metal fibers (e.g. steel) or a mixture thereof.

The organic fibers may notably be selected from among polyvinyl alcohol (PVA) fibers, poly-acrylonitrile (PAN) fibers, high density polyethylene (HDPE) fibers, polyamide or polyimide fibers, polypropylene fibers, aramid fibers or carbon fibers. Mixtures of these fibers may also be used.

These organic fibers may appear as an object either consisting of single strand or multiple strands, the diameter of the object ranging from 25 microns to 800 microns. The individual length of the organic fibers is preferably comprised between 10 and 50 mm.

As for metal fibers, these may be metal fibers selected from among steel fibers such as high mechanical strength steel fibers, amorphous steel fibers, or further stainless steel fibers. Optionally, the steel fibers may be coated with a non-ferrous metal such as copper, zinc, nickel (or theft alloys).

The individual length of the metal fibers is preferably of at least 2 mm and is, even more preferentially, comprised in the range 10-30 mm.

Fibers which are notched, corrugated or hooked-up at the ends may be used.

Preferably, the amount of fibers is comprised from 0.1 to 6%, even more preferentially from 1 to 5% of the volume of the hydraulic composition.

Resorting to mixtures of fibers with different features gives the possibility of adapting the properties of the concrete with respect to the sought features.

It should be noted that the fibers may be added to the binder or to the mixture according to the invention.

The hydraulic composition according to the invention may be prepared by mixing the mixture according to the invention or the hydraulic binder according to the invention with water.

According to an advantageous embodiment of the method for preparing a hydraulic composition according to the invention, the amount of water used is from 160 to 195 l/m$^3$ and preferably from 160 to 185 l/m$^3$.

The hydraulic composition may be reinforced, for example with metal frames.

The hydraulic composition may be prestressed, by cables or adherent tendons, or posttensioned, with cables or tendons or sheets or non-adherent bars. The prestressed, as a pretension or posttension, is particularly suitable for the compositions manufactured according to the present invention.

Advantageously, the hydraulic compositions obtained according to the invention have a compressional strength greater than or equal to 90 MPa at 28 days after mixing and/or greater than or equal to 120 MPa after heat treatment, for example after a heat treatment for 2 days at 90° C., made after 2 days at 20° C.

The hydraulic composition according to the invention may be prepared according to methods known to one skilled in the art, comprising the mixing of solid components and water, shaping (for example, casting, projection, spraying or calendaring) and hardening.

The hydraulic composition according to the invention may be subject to a heat treatment after setting in order to improve its mechanical properties. The treatment after setting, also called thermal curing of the concrete, is generally achieved at a temperature from 60° C. to 90° C. The temperature of the heat treatment should be less than the boiling temperature of water at ambient pressure. The temperature of the heat treatment after setting is generally less than 100° C.

The duration of the heat treatment after setting may for example be from 6 hours to 4 days, preferably of about 2 days. The heat treatment may begin, generally at least one day before the beginning of the setting and preferably on concrete with an age from 1 to 12 days at 20° C.

The heat treatment may be carried out in dry or humid environments or according to cycles which alternate both environments, for example, a 24 hour treatment in a humid environment followed by a treatment for 24 hours in a dry environment.

The invention also relates to an object shaped for the field of building comprising the hydraulic binder according to the invention or the mixture according to the invention.

The following measurement methods were used:

Laser Grain Size Measurement Method

The grain size curves of the different powders are obtained with a laser Malvern MS2000 granulometer. The measurement is carried out in a suitable medium (for example, in an aqueous medium); the size of the particles should be comprised from 0.02 μm to 2 mm. The light source consists of a red He—Ne laser (632 nm) and a blue diode (466 nm). The optical model is the Fraunhofer one, the computation matrix is of the polydisperse type.

A measurement of background noise is first of all carried out with a pump rate of 2,000 rpm, a stirring rate of 800 rpm and a measurement of noise over 10 s, in the absence of ultrasonic waves. It is then checked that the light intensity of the laser is at least equal to 80%, and that a decreasing exponential curve is obtained for the background noise. If this is not the case, the lenses of the cell have to be cleaned.

A first measurement is then carried out on the sample with the following parameters: pump rate of 2,000 rpm, stirring rate of 800 rpm, absence of ultrasonic waves, obscuration limit between 10 and 20%. The sample is introduced in order to have an obscuration slightly greater than 10%. After stabilization of the obscuration, the measurement is carried out with a duration between the immersion and the measurement set to 10 s. The measurement duration is of 30 s (30,000 analyzed diffraction images). In the obtained granulogram, the fact that a portion of the population of the powder may be agglomerated should be taken into account.

Next a second measurement (without emptying the tank) is then carried out with ultrasonic waves. The pump rate is brought to 2,500 rpm, the stirring to 1,000 rpm, the ultrasonic waves are 100% emitted (30 Watts). This rate is maintained for 3 minutes, and then one returns to the initial parameters: pump rate 2,000 rpm, stirrer rate of 800 rpm, absence of ultrasonic waves. After 10 s (for removing the possible air bubbles), a measurement is made for 30 s (30,000 analyzed images). This second measurement corresponds to a powder de-agglomerated by ultrasonic dispersion.

Each measurement is repeated least twice in order to check the stability of the result. The apparatus is calibrated before each working session by means of a standard sample (silica C10 Sifraco) the grain size curve of which is known. All the measurements shown in the description and the announced ranges correspond to the values obtained with ultrasonic waves.

BET Specific Surface Area Measurement Method

The specific surface area of the various powders is measured as follows. A powder sample is taken with the following mass: 0.1 to 0.2 g for an estimated specific surface area of more than 30 m$^2$/g; 0.3 g for an estimated specific surface area of 10-30 m$^2$/g; 1 g for an estimated specific surface area of 3-10 m$^2$/g; 1.5 g for an estimated specific surface area of 2-3 m$^2$/g; 2 g for an estimated specific surface area of 1.5-2 m$^2$/g; 3 g for an estimated specific surface area of 1-1.5 m$^2$/g.

A 3 cm$^3$ or 9 cm$^3$ cell is used depending on the volume of the sample. The whole of the measurement cell (cell+glass rod) is weighed. Next the sample is added into the cell: the product should not be at less than one millimeter from the top of the neck of the cell. The whole (cell+glass rod+sample) is weighed. The measurement cell is set into place on a degassing station and the sample is degassed. The degassing parameters are 30 min/45° C. for Portland cement, gypsum, pozzolans; 3 h/200° C. for slags, flying ashes, aluminous cement, limestone; and 4 h/300° C. for controlled alumina. The cell is rapidly blocked with a plug after degassing. The whole is weighed and the result is noted. All the weighing operations are carried out without the plug, the latter being temporarily removed for making the measurement. The mass of the sample is obtained by subtracting the mass of the cell from the sum of the masses of the cell and of the degassed sample.

Next analysis of the sample is carried out after having set it into place on the measurement station. The analyser is the SA 3100 from Beckman Coulter. The measurement is based on the adsorption of nitrogen by the sample at a given temperature, here the liquid nitrogen temperature i.e. about −196° C. The apparatus measures the pressure of the reference cell in which the adsorbate is at its saturating vapor pressure and that of the cell of the sample into which known volumes of adsorbate are injected. The resulting curve from these measurements is the adsorption isotherm. In the measurement method, the knowledge of the dead volume of the cell is required: a measurement of this volume is therefore conducted with helium before the analysis.

The sample mass computed earlier is entered as a parameter. The BET surface area is determined by the piece of software by linear regression from the experimental curve. The reproducibility standard deviation obtained from 10 measurements on a silica with specific surface area of 21.4 $m^2/g$ is 0.07. The obtained reproducibility standard deviation from 10 measurements on a cement with specific surface area of 0.9 $m^2/g$ is 0.02. Once every two weeks, a check is carried out on a reference product. Twice a year, a check is conducted with the reference alumina provided by the manufacturer.

Compressional Strength Measurement Method

Regardless of the deadline, the compressional strength is measured on cylindrical sample having a diameter of 7 cm and a height of 14 cm, the surfaces on which the compressive force is applied to the sample are flattened.

The applied compressive force is increased up to a level of 3.85 kN/s during the compression test.

EXAMPLES

The present invention is described by the examples A, B, C, D, E, F, G, H which follow, which are non-limiting.

| ✓ | Raw materials: | |
|---|---|---|
| ✓ | Cement 52.5N PMES Le Teil | Lafarge France |
| ✓ | Millisil C6 | Sibelco, France |
| ✓ | Silica fume, MST02 Le Pontet | SEPR, France |
| ✓ | Anhydrite, Micro A | Maxit, France |
| ✓ | Sand, BE01 | Sibelco, France |
| ✓ | Superplasticizer F2 | Chryso, France |

The cement was prepared by milling and separating Portland cement CEM I, 52.5N PMES, from Lafarge Le Teil cement works. This milling was carried out by using an air jet milling machine associated with a very high efficiency separator. The ground cement obtained had a D10 of 1.7 μm, a D50 of 5.3 μm, and a D90 of 10.6 μm. The Blaine specific surface was 6,950 $cm^2/g$ and the BET specific surface area was 1.65 $m^2/g$.

Le Millisil C6 is a siliceous filler (quartz) from Sibelco. It corresponds to the A1 addition. It has a D10 of 2.9 μm, a D50 of 28.9 μm, and a D90 of 95.6 μm.

The silica fume MST 02 from SEPR, is characterized by a BET specific surface area of 12 $m^2/g$.

Micro A anhydrite is micronized anhydrous calcium sulfate supplied by Maxit. It has a D10 of 1.6 μm, D50 of 12.3 μm and D90 of 17.0 μm.

BE01 sand is siliceous sand supplied by Sibelco. It has a D10 of about 210 μm, and a D50 of about 310 μm, a D90 of about 400 μm.

The superplasticizer F2 is a new generation superplasticizer containing a modified polycarboxylate.

Equipment:
kneader-mixer RAYNERI R601, which was provided by VMI with a tank of 10 liters. This kneader exerts a planetary rotary movement;
cylindrical cardboard molds with a diameter of 7 cm and a height of 14 cm;
a weathering chamber with 95-100% relative hygrometry and 90° C.+/−1° C. provided by Verre Labo Mula;
a humid chamber with 95-100% relative hygrometry and 20+/−1° C.

Procedure for Preparing the Hydraulic Composition According to the Invention:

The concrete (hydraulic composition) was manufactured according to the procedure described hereafter:
1) introduction of the dry materials (sand, A1, cement, calcium sulfate and silica fume) in the bowl of the Rayneri kneader;
2) kneading for 3 minutes at the rate of 15 revolutions per minute, for homogenizing the dry materials;
3) introduction of the mixing water and one half of the super-plasticizer over 30 seconds, at a rotation speed of 35 revolutions per minute;
4) kneading for 4 minutes and 30 seconds at a speed of 35 revolutions per minute;
5) introduction of the other half of superplasticizer over 30 seconds at a rotation speed of 50 revolutions per minute;
6) kneading for 2 minutes and 30 seconds at speed of 50 revolutions per minute;
7) stopping the kneader.

A fresh concrete was obtained. The concrete was cast into cylindrical molds. The obtained molded specimens are hermetically closed and are pending for 24 hours at 20° C. Next, the specimens are removed from the mold and are either placed:
in a humid chamber for 28 days at 20° C. and 100% of relative humidity; or
in a humid chamber for 7 days at 20° C. and 100% relative humidity, and then in a weathering chamber for 48 h at 90° C. and 100% relative humidity (heat treatment).

The mechanical strengths were then measured.

Hydraulic binders according to the invention, in % by mass:

| | % Cement | % A1 | % Silica Fume | % Calcium sulfate |
|---|---|---|---|---|
| A | 18.2% | 40.7% | 40.3% | 0.8% |
| B | 42.0% | 37.5% | 18.6% | 1.9% |
| C | 17.7% | 61.9% | 19.6% | 0.8% |
| D | 48.7% | 43.1% | 6.0% | 2.2% |
| E | 25.6% | 66.9% | 6.3% | 1.2% |
| F | 26.3% | 46.6% | 25.9% | 1.2% |
| G | 33.9% | 52.1% | 12.5% | 1.5% |
| H | 34.0% | 48.0% | 16.5% | 1.5% |

Composition of the mixtures according to the invention in volume %:

|   | % Hydrolic binder | % Sand |
|---|---|---|
| A | 50.8% | 49.2% |
| B | 51.0% | 49.0% |
| C | 50.8% | 49.2% |
| D | 51.1% | 48.9% |
| E | 50.8% | 49.2% |
| F | 50.8% | 49.2% |
| G | 50.9% | 49.1% |
| H | 50.9% | 49.1% |

Hydraulic compositions according to the invention in liters per 1 m³ of concrete:

The hydraulic compositions according to the invention are described below in liters/m³ of concrete excluding entrained air and excluding fibers.

|   | Mixture | Admixture | Added Water | Total Water |
|---|---|---|---|---|
| A | 828.9 | 18.7 | 152.4 | 166.8 |
| B | 821.6 | 12.2 | 166.2 | 175.5 |
| C | 833.0 | 12.2 | 154.8 | 164.2 |
| D | 804.1 | 10.3 | 185.6 | 193.5 |
| E | 808.2 | 9.4 | 182.4 | 189.6 |
| F | 832.0 | 13.1 | 154.9 | 165.0 |
| G | 832.0 | 11.2 | 156.8 | 165.5 |
| H | 829.8 | 11.7 | 158.5 | 167.5 |

Performance of the hydraulic composition:

Mechanical compressive strengths were measured on a cylinder of diameter 70 mm and height of 140 mm. The results are expressed as MPa.

|   | CS at 28 days/20° C. | CS Heat treatment |
|---|---|---|
| A | 135.6 | 199.4 |
| B | 187.2 | 239.1 |
| C | 134.8 | 196.2 |
| D | 164.9 | 202.4 |
| E | 128.9 | 169.1 |
| F | 154.9 | 219 |
| G | 181.4 | 225.2 |
| H | 176 | 235.7 |

The invention claimed is:

1. A hydraulic binder comprising as percentage by mass:
   from 17 to 55% of a Portland cement the particles of which have a D50 comprised from 4 µm to 9 µm, the Portland cement having a Blaine specific surface area that is greater than or equal to 5,000 cm²/g;
   at least 5% of silica fume;
   from 36 to 70% of a mineral addition A1 the particles of which have a D50 comprised from 15 to 150 µm;
   a sum of the percentages of cement, silica fume and the mineral addition A1 being comprised from 80 to 100%;
   a sum of the percentages of cement and silica fume being greater than 28%;
   the mineral addition A1 being selected from the group consisting of calcined shales, materials containing calcium carbonate, fly ashes, zeolites, ashes derived from combustion of plants, calcined clays, quartz, slag, said slag being optionally ground, and any mixtures thereof.

2. The hydraulic binder according to claim 1, wherein the cement is a CEM I cement.

3. The hydraulic binder according to claim 1, further comprising calcium sulfate.

4. The hydraulic binder according to claim 1, wherein the cement particles have a D90 comprised from 8 µm to 25 µm.

5. The hydraulic binder according to claim 1, wherein the mineral addition A1 includes quartz.

6. The hydraulic binder according to claim 1, wherein the mineral addition A1 includes calcium carbonate.

7. A mixture comprising as percentage by volume, at least 45% of the hydraulic binder according to claim 1 and at least 30% of sand, a sum of the percentages of the hydraulic binder and the sand being comprised from 95 to 100%, wherein the particles of sand have a D50 greater than 200 µm.

8. The mixture according to claim 7, further comprising a sand the particles of which have a D10 comprised from 100 µm to 1 mm and a D50 comprised from 200 µm to 3 mm and a D90 from 300 µm to 5 mm.

9. The mixture according to claim 7, wherein the sand is a siliceous sand, a calcined bauxite sand, a siliceous limestone sand, a limestone sand or mixtures thereof.

10. A hydraulic composition comprising in a volume of 1 m³ excluding entrained air and excluding fibers:
    from 155 to 205 liters of water;
    at least 770 liters of mixture according to claim 7;
    the sum of the volumes of the water and the mixture being comprised from 950 to 1,000 liters.

11. The hydraulic composition according to claim 10 comprising an antifoaming agent.

12. The hydraulic composition according to claim 10, further comprising mineral, organic or metal fibers, or a mixture thereof.

13. A shaped object for the field of building comprising the hydraulic binder according to claim 1.

14. A shaped object for the field of building comprising the mixture according to claim 7.

* * * * *